United States Patent [19]
Rowley

[11] Patent Number: 5,927,466
[45] Date of Patent: Jul. 27, 1999

[54] SWITCHING APPARATUS FOR ARTICLE SORTING SWITCH

[75] Inventor: Gavin D. Rowley, Richardson, Tex.

[73] Assignee: Sasib Bakery North America, Inc., Plano, Tex.

[21] Appl. No.: 09/189,891

[22] Filed: Nov. 10, 1998

Related U.S. Application Data

[63] Continuation of application No. 08/996,939, Dec. 23, 1997, abandoned.

[51] Int. Cl.[6] .................................................. B65G 47/46
[52] U.S. Cl. .................. 198/370.03; 198/370.02
[58] Field of Search ......................... 198/370.01, 370.02, 198/370.03

[56] References Cited

U.S. PATENT DOCUMENTS

| | | | |
|---|---|---|---|
| 3,608,698 | 9/1971 | Crall ............................................. | 198/81 |
| 3,986,596 | 10/1976 | Hamilton ................................. | 198/367 |
| 3,987,888 | 10/1976 | Wickam ................................... | 198/802 |
| 4,508,206 | 4/1985 | Moore et al. ............................ | 198/365 |
| 4,946,022 | 8/1990 | Davis et al. .............................. | 198/365 |
| 5,131,522 | 7/1992 | Fujio .................................. | 198/370.02 |
| 5,135,100 | 8/1992 | Cotter et al. ....................... | 198/370.02 |
| 5,275,273 | 1/1994 | Veit et al. ....................... | 198/370.02 X |

Primary Examiner—James R. Bidwell
Attorney, Agent, or Firm—Michael A. O'Neil

[57] ABSTRACT

A switching apparatus for use in conjunction with a horizontal switch includes a pair of opposed fixed guide members having facing guide surfaces defining a central output path and opposed angularly extending guide surfaces defining left and right output paths. A pair of movable guide members comprise facing guide surfaces and opposed, diverging guide surfaces. Rotary solenoids are used to selectively position the movable guide members in engagement with corresponding dampening pads thereby positioning the facing guide surfaces of the movable guide blocks to direct switch engaging members along the central output path between the fixed guide blocks. Actuation of either rotary solenoid positions its corresponding movable guide block with its facing surface engaging the facing surface of the other guide block while the opposed surface thereof engages its corresponding dampening member, thereby positioning the diverging surface of the actuated movable guide block in alignment with the diverging surface of the corresponding fixed guide block to direct the switch engaging members along a selected output path.

4 Claims, 8 Drawing Sheets

SWITCHING APPARATUS FOR ARTICLE SORTING SWITCH

This application is a continuation of application Ser. No. 08/996,939 filed on Dec. 23, 1997, now abandoned.

TECHNICAL FIELD

This invention relates generally to article sorting switches of the type known as horizontal switches, and more particularly to an improved switching apparatus useful in horizontal switches and in similar applications.

BACKGROUND AND SUMMARY OF THE INVENTION

The present invention comprises an improvement over the switching apparatus disclosed in U.S. Pat. No. 4,946,022 ("the '022 Patent") granted to Davis, et al. on Aug. 7, 1990, and assigned to Stewart Systems, Inc., the predecessor-in-interest of the assignee of the present invention, the disclosure of which is incorporated herein by reference. The '022 Patent discloses a switching apparatus incorporating a double acting cylinder which is utilized to locate a switching channel in any one of three selected switching orientations. The device disclosed in the '022 Patent has proven itself to be generally satisfactory in commercial utilization, however, the apparatus of the '022 Patent requires the reaction forces caused by switching operations to be resisted by the double-acting cylinder mechanism thereof. This fact leads to increased maintenance requirements because the precise alignment of the switching apparatus under the action of the double-acting cylinder is necessary in order that switching operations can be properly carried out.

The present invention comprises an improved switching apparatus useful in conjunction with horizontal switches and in similar operations which overcomes the foregoing and other problems long since associated with the prior art. In accordance with the broader aspects of the invention, a switching apparatus includes switching members which are positioned against fixed stops during switching operations. Because the fixed stops precisely position the switching members, the frequency of maintenance operations which are necessary in order to maintain proper alignment of the switching apparatus of the prior art device is substantially reduced.

More specifically, the switching apparatus of the present invention utilizes a pair of opposed rotary solenoids. The rotary solenoids are each positively driven in both directions, and an interlock has provided for eliminating the possibility of simultaneous actuation of the two rotary solenoids. Upon actuation of one of the rotary solenoids to position the switching member controlled thereby, the actuated switching member is moved into engagement with the switching member of the opposite rotary solenoid which in turn abuts a fixed stop. In this manner, precise alignment of the switching members is constantly maintained.

BRIEF DESCRIPTION OF THE DRAWINGS

A more complete understanding of the invention may be had by reference to the following Detailed Description when taken in conjunction with the accompanying drawings, wherein.

DETAILED DESCRIPTION

Figures 1, 3, 4:
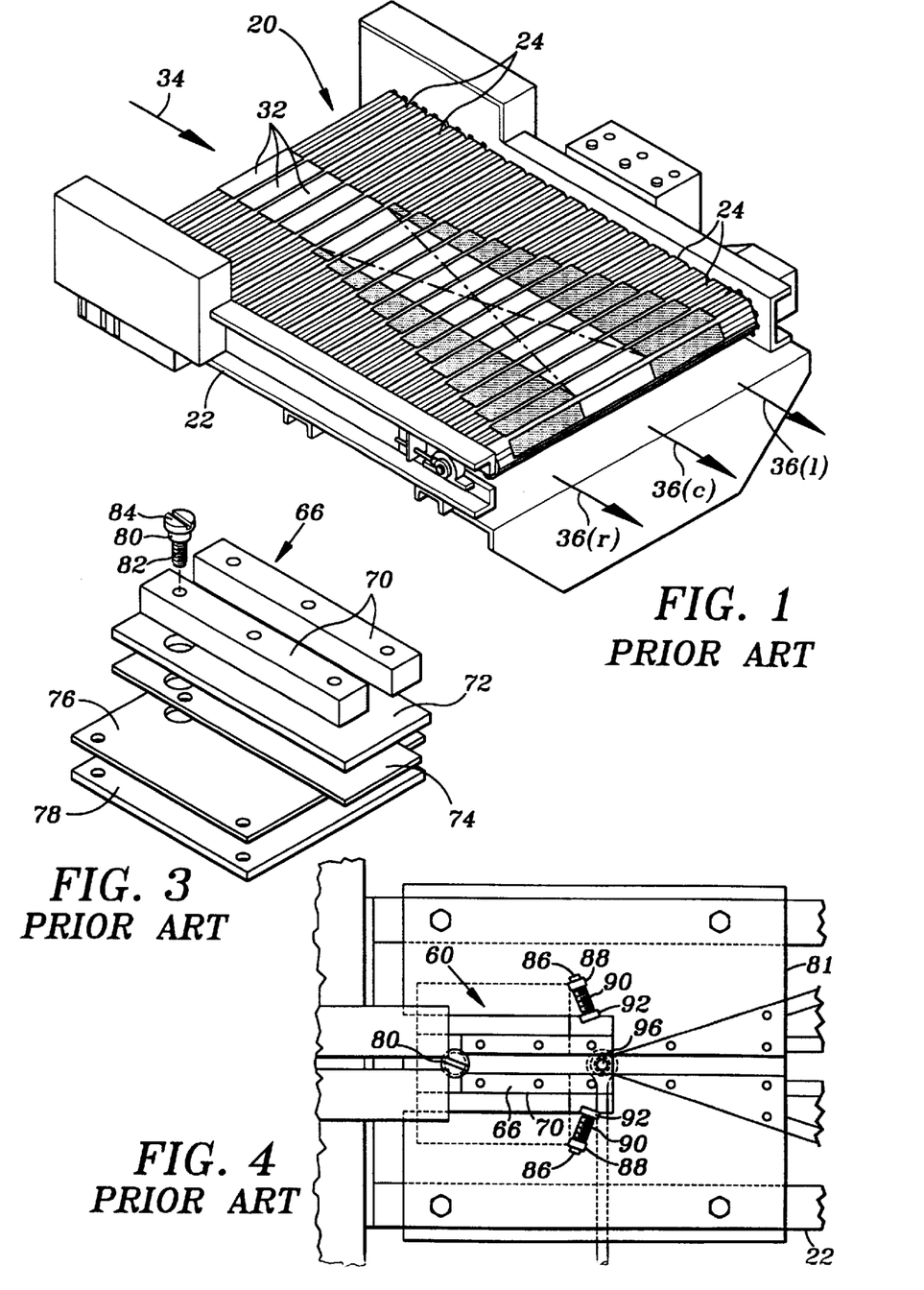
FIG. 1 is a perspective view illustrating a horizontal switch of the type disclosed and claimed in U.S. Pat. No. 4,946,022.
FIG. 3 is an exploded perspective view of the switching apparatus of the horizontal switch of FIG. 1.
FIG. 4 is an enlargement of a portion of FIG. 2.

Referring now to the drawings, and particularly to FIG. 1 thereof, there is shown a horizontal switch 20 of the type disclosed and claimed in U.S. Pat. No. 4,946,022, the disclosure of which is incorporated herein by reference as if fully set forth herein. The horizontal switch 20 includes a frame 22 which supports a plurality of pallet support members 24 for movement around a closed course including an upper horizontally disposed article sorting portion, a lower horizontally disposed pallet return portion, and curved end portions interconnecting the upper and lower portions. A plurality of pallets 32 are slidably supported on the pallet support members 24. In the operation of the horizontal switch 20, a sequence of articles is directed onto the pallets 32 along a single input path 34, and the pallets are actuated to selectively discharge individual articles along any one of three output paths 36R, 36C, and 36L.

Figure 2:
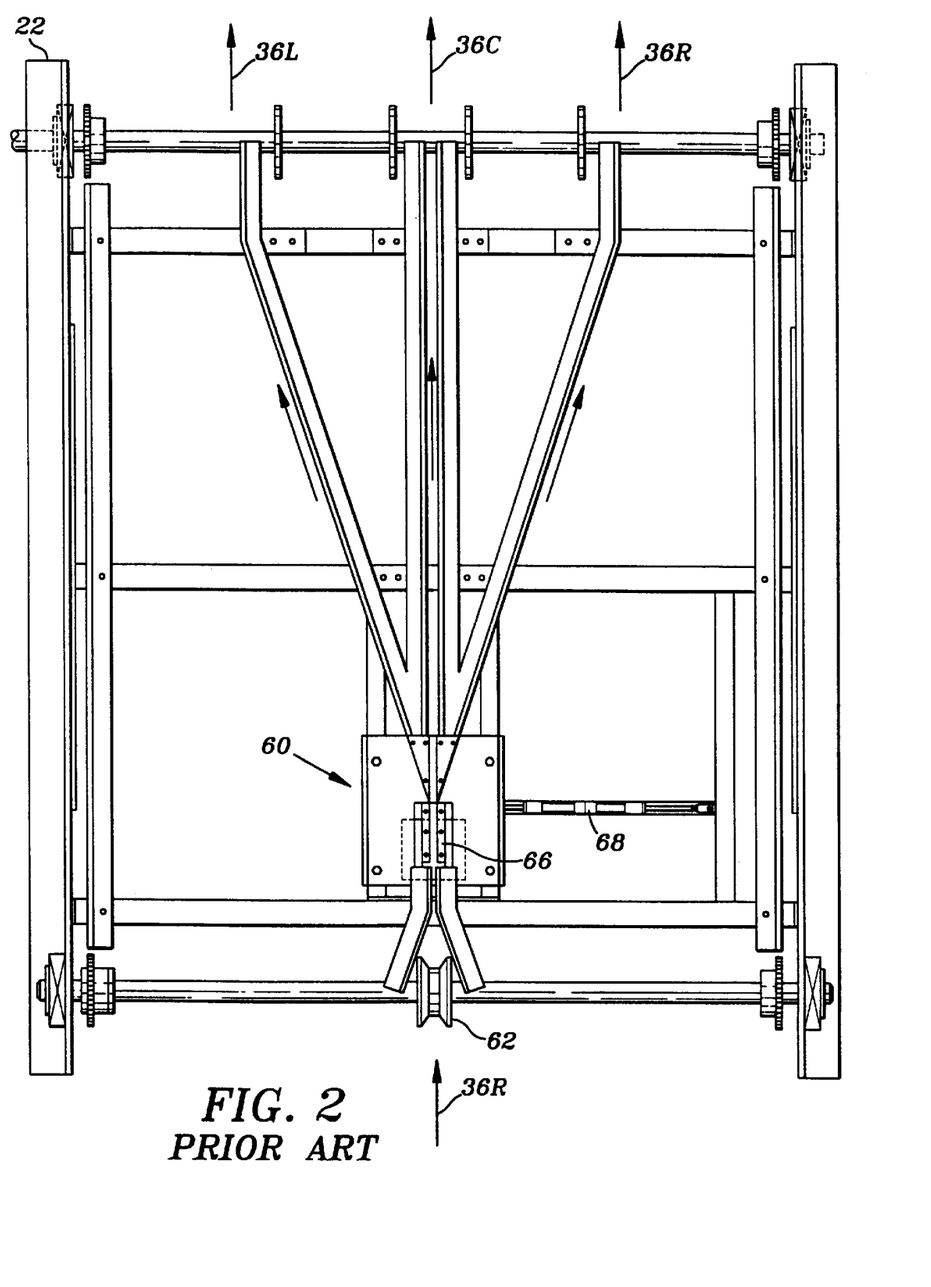
FIG. 2 is top view illustrating the switching apparatus of the horizontal switch of FIG. 1.

Referring to FIG. 2, each of the pallets 32 has a depending switch engaging member which is received by a guide wheel 62 and directed therefrom into a switching apparatus 60 including a switching channel 66. The switching channel 66 is selectively positioned by a double-acting cylinder 68 to direct the individual pallet either toward the output path 36R, or the output path 36C, or the output path 36L.

Referring to FIG. 3, the switching channel 66 includes diverter bars 70 which are supported on a diverter plate 72 by a suitable fasteners. The diverter bars 70 define a switch engaging member receiving channel therebetween. A layer of low-friction material 74 is adhesively secured to the underside of the diverter plate 72. Another layer of low-friction material 76 is secured to a support plate 78. A diverter post 80 includes a lower threaded portion 82 which is received by the support plate 78 and an upper bearing portion 84 which is received in the diverter plate 72. Thus, it will be understood that the switching channel 66 defines a switch engaging member receiving channel which is supported for pivotal movement about an axis defined by the diverter posts 80.

The overall structure of the switching apparatus 60 of the sorting switch 20 is further illustrated in FIG. 4. The component parts of the switching apparatus are supported by base plate 81 which is in turn secured to the frame 22. The axis pivotal movement of the diverter plate 72 and the diverter bars 74 carried thereby as defined by the diverter post 80 is coincident with the entry end of the channel defined by the diverter bars. Therefore, the switching channels 66 is adapted to receive a switch engaging member depending from a pallet regardless of its pivotal positioning. The switching channel 66 is selectively pivoted by means of a rod 94 which is pivotally secured to the diverter plate 72 at 96. The rod 94 in turn extends to the double-acting cylinder 68. More particularly, the double-acting cylinder functions to cause the switching apparatus 60 to direct pallets towards the output path 36R, or the output path 36C, or the output path 36L depending upon whether none, one, or both of the cylinders of the double-acting cylinder mechanism 68 is actuated.

The limits of pivotal movement of the switching channel 66 are defined by a pair of stops 86. Each stop 86 includes a base 88 which is secured to the base plate 81, a threaded rod 90 which threadedly engages the base 88, and a diverter bar engaging stop 92 which is supported on the distal end of the threaded rod 90. The positioning of the stop, and therefore the limits of pivotal movement of the switching channel are determined by selectively rotating the threaded rod of a particular stop 86 relative to the base 88 thereof.

As will be understood by those skilled in the art, although the stops 86 limit the pivotal movement of the switching channel 66, the stops 86 do not absorb the reaction force which is occasioned when the switching engaging member of a pallet is directed either toward the output path 36R or the output path 36L. Thus, although a particular stop 86 engages one of the diverter bars 70, it is the opposite diverter bar 70 which receives the reaction force. Thus, it will be understood that the reaction force is directed from the diverter bar 70 comprising the switching channel 66 directly into the double-acting cylinder 68 or other actuating mechanism which is employed to effect selective positioning of the switching channel 66.

Figure 5:
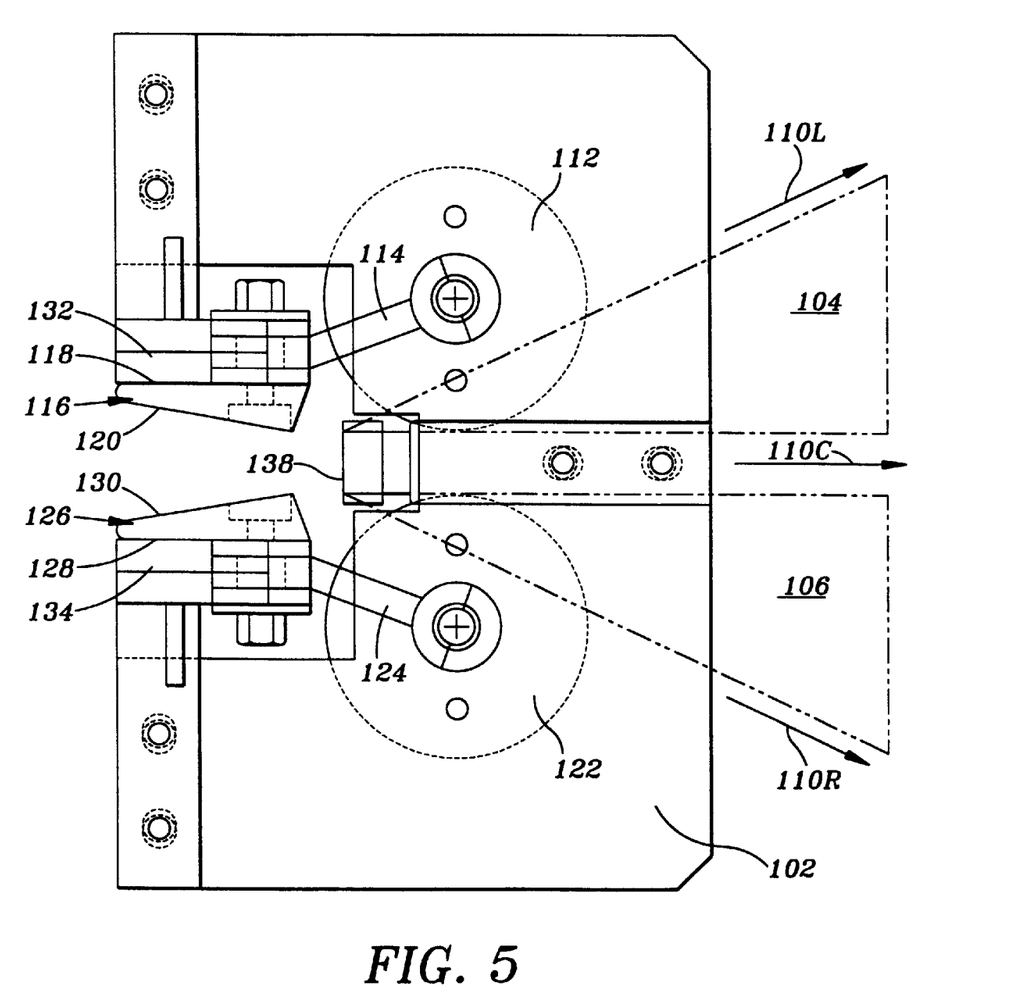
FIG. 5 is a top view of the switching apparatus of the present invention.

Referring now to FIG. 5, there is shown a switching apparatus 100 incorporating the present invention. The switching apparatus 100 includes a mounting bracket 102 which supports the component parts of the apparatus. A pair of guide blocks 104 and 106 define guide paths 110L, 110C, and 110R.

A left hand rotary solenoid 112 is supported on the bracket 102. The rotary solenoid 112 actuates a pivot arm 114 which in turn functions to locate a guide block 116. The guide block 116 comprises guide surfaces 118 and 120.

A right hand rotary solenoid 122 is also supported on the bracket 102. The solenoid 122 has a pivot arm 124 which supports a guide block 126. The guide block 126 has guide surfaces 128 and 130.

Figure 6:
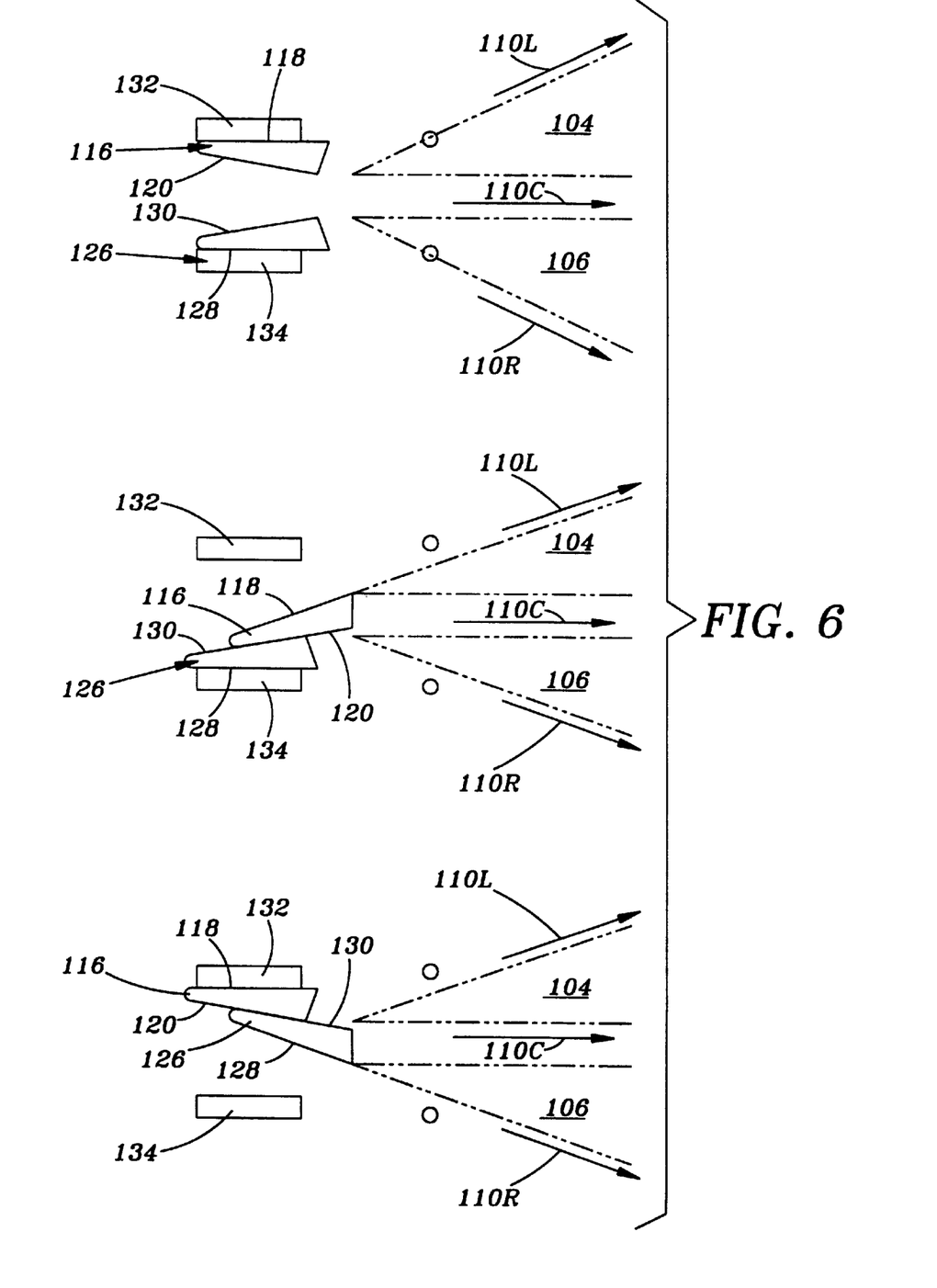
FIG. 6 is an illustration of the three operating states of the switching apparatus of FIG. 5.

The rotary solenoid 122 has two operating conditions. As is shown in FIG. 6, the rotary solenoid 112 has an actuated condition in which the guide surface 120 of the guide block 116 engages the guide surface 130 of the guide block 126. The rotary solenoid 122 also has a retracted condition in which the guide surface 118 engages a dampening pad 132.

The rotary solenoid 122 also has two operating conditions. These include a retracted condition in which the guide surface 128 engages a dampening pad 134, and an actuated position in which the guide block 126 is pivoted away from the dampening pad 134 and toward the dampening pad 132 until the guide surface 130 of the guide block 126 engages the guide surface 120 of the guide block 116.

Assume first that the rotary solenoids 112 and 122 are both in their retracted states. The guide blocks 116 and 126 are thus positioned as shown in FIG. 5. When the rotary solenoids 112 and 122 are both retracted, the guide surfaces 120 and 130 are positioned opposite one other and function to funnel the switch engaging members of the pallets of the horizontal switch into the center channel 110C extending between the guide blocks 104 and 106.

Assume now that the rotary solenoid 112 is in the actuated condition and the rotary solenoid 122 is in the retracted condition. When the rotary solenoid 112 is actuated and the rotary solenoid 122 is retracted, the guide surface 120 of the guide block 116 engages the guide surface 130 of the guide block 126, thereby positioning the guide surface 118 of the guide block 166 to deflect the switch engaging members of the pallet into the left hand path 110L as defined by the guide block 104. At this point the rear surface 136 of the guide block 116 engages a dampening pad 138, while the rear surface 146 of the guide block 126 is spaced therefrom.

Assume now that the rotary solenoid 112 is retracted and that the rotary solenoid 122 is actuated. At this point the guide surface 118 of the guide block 116 engages the dampening pad 132 and the guide surface 130 of the guide block 126 engages the guide surface 120 of the guide block 116. The rear surface 146 of the guide block 126 engages the dampening pad 138, while the rear surface 136 of the guide block 116 is spaced therefrom. At this point the guide surface 128 of the guide block 126 is positioned to direct the switch engaging members of the pallets into the right hand path 110R as defined by the guide block 106.

It will therefore be understood that the switching apparatus 100 of the present invention is capable of three operating states. In the first operating state, both of the rotary solenoids 112 and 122 are retracted, whereupon the switch engaging members of the pallets pass between the guide surfaces 120 and 130 and follow the central path extending between the guide blocks 104 and 106, thereby causing the pallets to follow the central pallet path 110C. In the second operating state the rotary solenoid 112 is actuated but the rotary solenoid 122 is retracted. This causes the switch engaging members of the pallets to engage the guide surface 118 of the guide block 116, thereby causing the pallets to be directed into alignment with the path 110L as defined by the guide block 104. In the third operating state the rotary solenoid 112 is retracted while the rotary solenoid 122 is actuated. At this point the switch engaging members of the pallet engage the guide surface 128 of the guide block 126, whereupon the pallets are diverted into alignment with the path 110R as defined by the guide block 106. As will be appreciated by those skilled in the art, it is not possible for both the rotary solenoid 112 and the rotary solenoid 122 to be in the actuated state simultaneously.

Figure 7:
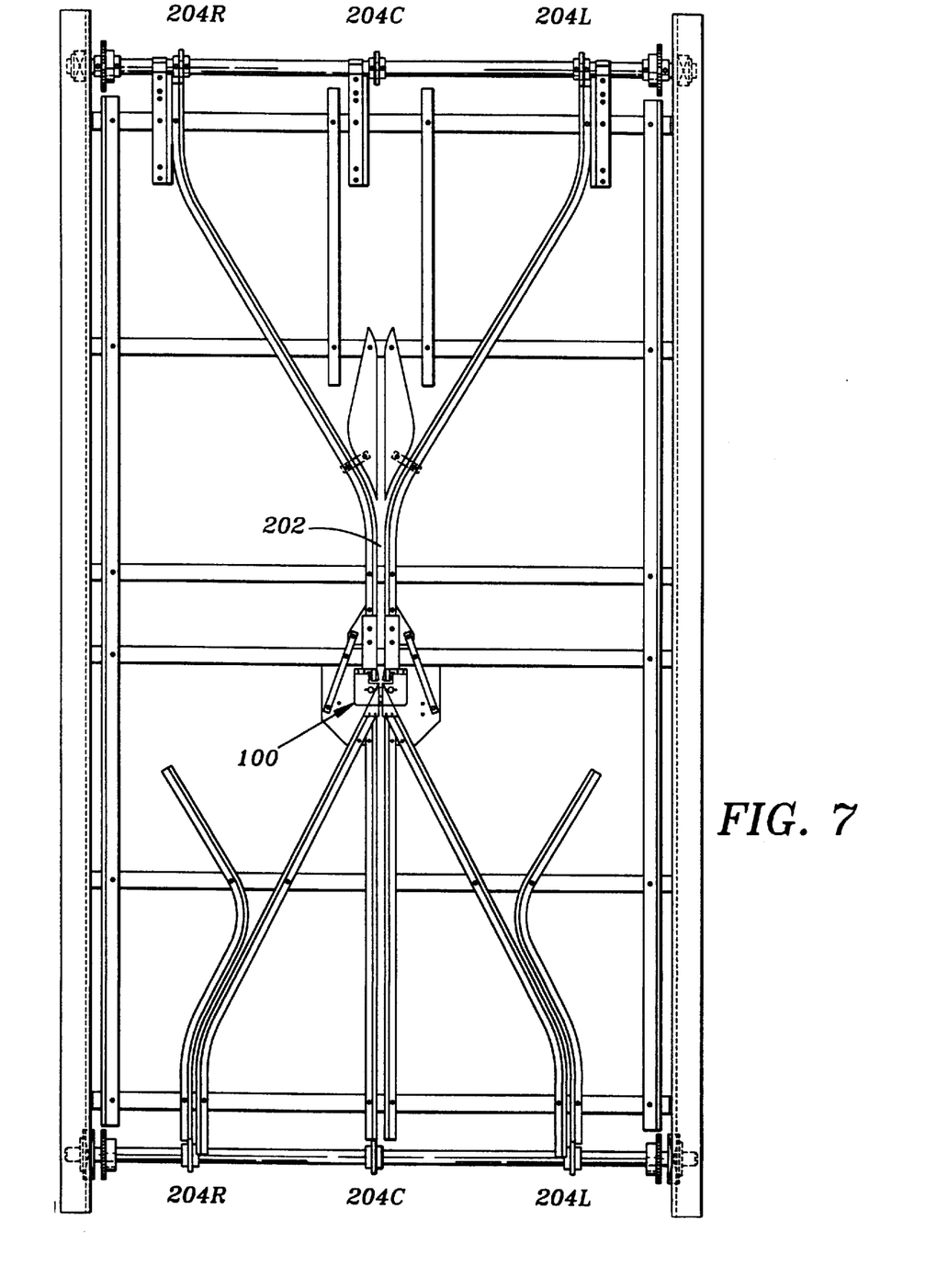
FIG. 7 is a top view of a horizontal switch incorporating the switching apparatus of FIG. 5.

Referring now to FIG. 7, there is shown a horizontal switch 200 incorporating the switching apparatus 100 of the present invention which is illustrated in FIGS. 5 and 6 and described hereinabove in conjunction therewith. The switching apparatus 100 functions to receive switching engaging members moving along a path 102 and to selectively direct the switching engaging members and the corresponding pallets into alignment with output paths 104L, 104C, or 104R. The horizontal switch 200 comprises a 3-in, 3-out horizontal switch, and as such comprises structure on the bottom thereof which is the mirror image of that shown in FIG. 7. The switching apparatus located at the bottom of the horizontal switch 200, which is identical in construction and function to the horizontal switch 100, functions to direct the pallet engaging members and the pallets connected thereto into alignment with a either input path 106R, or input path 106C, or input path 106L, all of which ultimately converge into input path 102 comprising the infeed for the switching apparatus 100 illustrated in FIG. 7.

Figure 8:
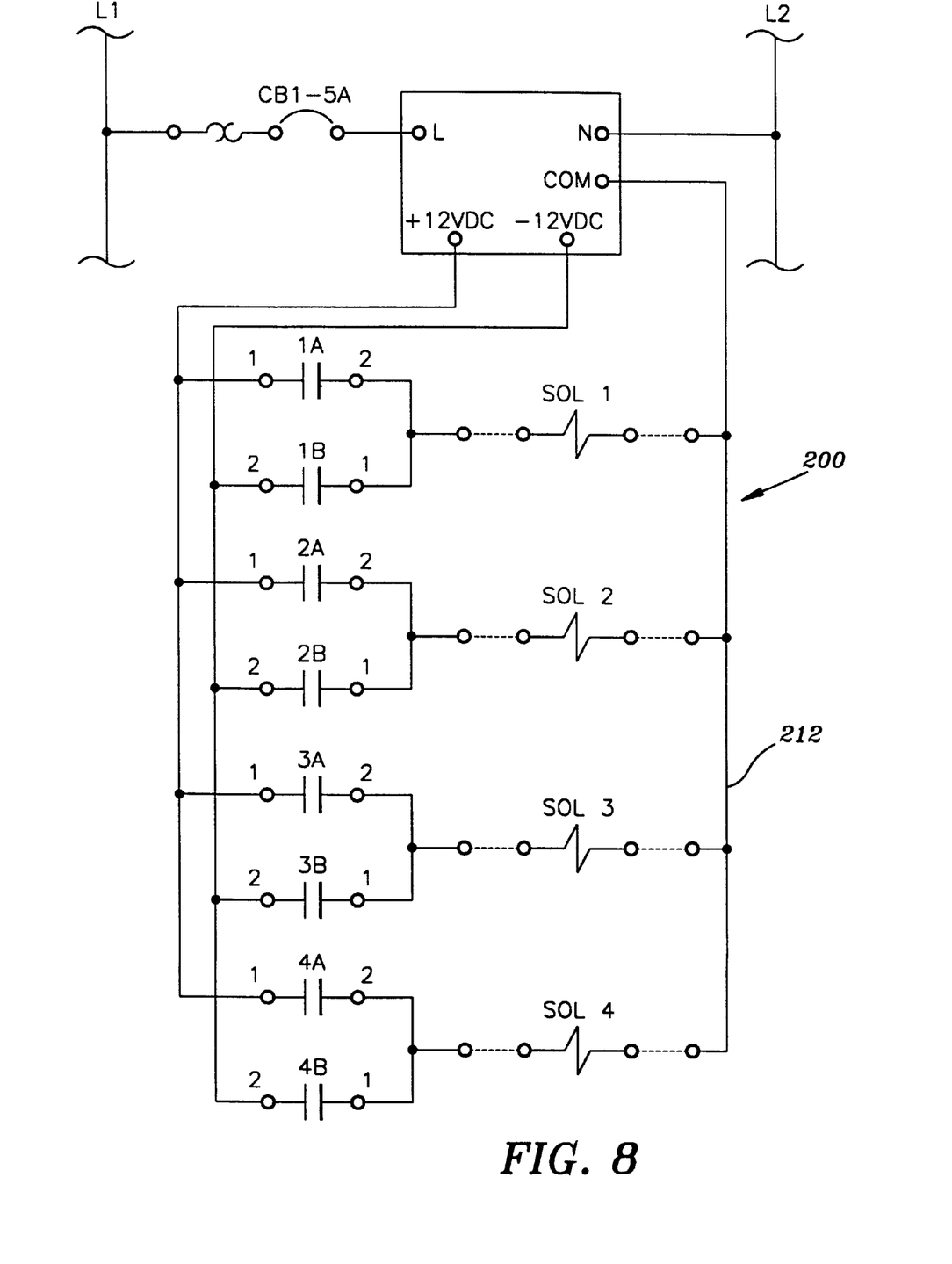
FIG. 8 is diagrammatic illustration of a portion of the control system for the switching apparatus of FIG. 5.
Figure 9A:
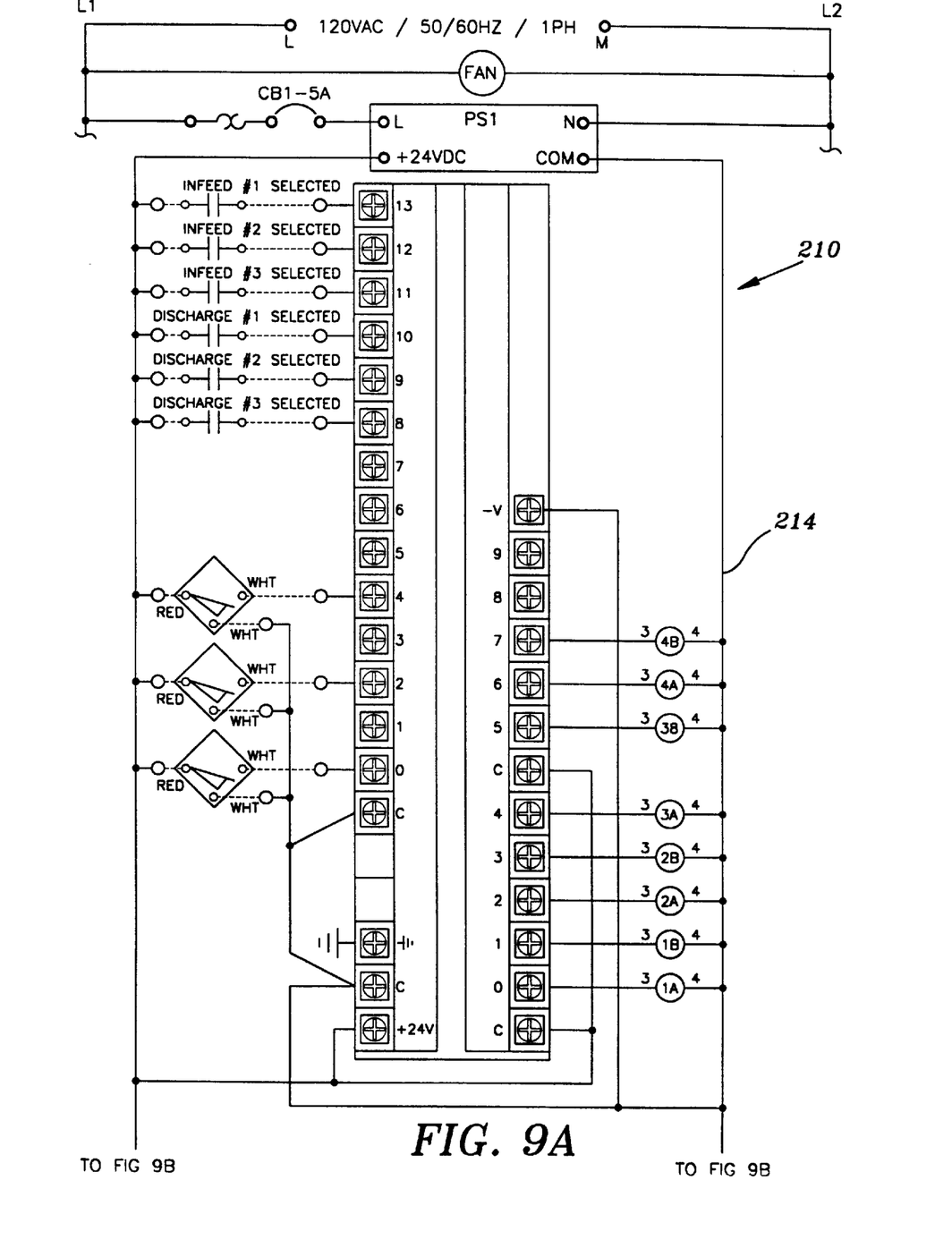
FIG. 9 is a diagrammatic illustration of another portion of the control system for the switching apparatus of FIG. 5.
Figure 9B:
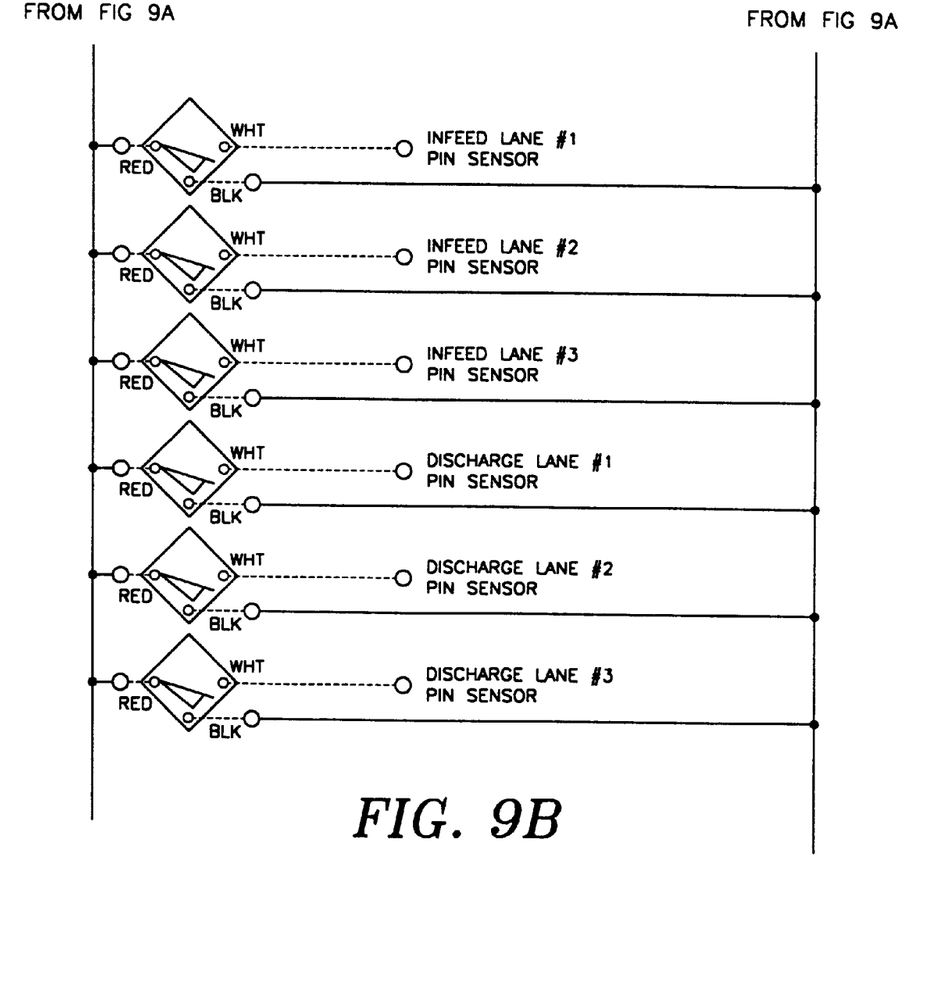

Referring now to FIGS. 8 and 9, the control system 210 for the switching apparatus of the present invention is illustrated. The control system 210 includes a circuit 212 illustrated in FIG. 8 which functions to positively drive the rotary solenoid 112 and 122 in both directions. Thus, the solenoids of the switching apparatus of the present invention do not comprise a swing return. The control system 210 further includes a programmed logic controller 214 which is shown in FIG. 9. The programmed logic controller 214 preferably is the type manufactured by Telemecanque and identified as model number TSX07 21 2412. The programmed logic controller 214 is programmed to prevent simultaneous operation of the rotary solenoid 112 and 122 of the switching apparatus 100.

Although preferred embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

I claim:

1. A switching apparatus comprising:
   a pair of equal and opposite fixed guide members each having an angular guide surface and defining a central output path therebetween, a leftward output path extending along one of the angular guide surfaces, and a rightward output path extending along the other angular guide surface;
   a pair of wedge-shaped movable guide blocks having opposed angular guide surfaces for cooperation with the angular guide surfaces of the fixed guide blocks to selectively divert switch engaging members along one or the other of the leftward and rightward output paths and facing guide surfaces adapted to direct switch engaging members along the central guide path extending between the fixed guide blocks;
   a pair of opposed dampening pads positioned for engagement by the opposed guide surfaces of the movable guide members to position the facing guide surfaces of the movable guide blocks to direct switch engaging members along a central guide path;
   means for selectively engaging the facing guide surface of one of the movable guide members with the facing guide surface of the other guide member while the opposed surface of the other guide member engages its corresponding dampening pad and thereby positioning the opposed guide surface of said one of the movable guide members in alignment with the diverging guide surface of one of the fixed guide blocks to direct switch engaging members along the left output guide path; and
   means for selectively positioning the facing guide surface of said other movable guide member in engagement with the facing guide surface of said one of the guide members while the opposed guide surface thereof engages its corresponding dampening pad thereby positioning the opposed guide surface of said other movable guide member in alignment with the outwardly diverting surface of the other fixed guide member to direct switch engaging members along the right output path.

2. A switching apparatus comprising:
   a pair of equal and opposite guide members each having an angular guide surface and defining a leftward output path extending along one of the angular guide surfaces and a rightward output path extending along the other angular guide surface;
   a pair of wedge-shaped pivotal guide blocks having opposed angular guide surfaces for cooperation with the angular guide surfaces of the fixed guide blocks to selectively divert switch engaging members along one or the other of the leftward and rightward output paths;
   a pair of opposed dampening pads positioned for engagement by the opposed guide surfaces of the movable guide;
   means for selectively engaging the facing guide surface of one of the movable guide members with the facing guide surface of the other guide member while the opposed surface of the other guide member engages its corresponding dampening pad and thereby positioning the opposed guide surface of said one of the movable guide members in alignment with the diverging guide surface of one of the fixed guide blocks to direct switch engaging members along the left output guide path; and
   means for selectively positioning the facing guide surface of said other movable guide member in engagement with the facing guide surface of said one of the guide members while the opposed guide surface thereof engages its corresponding dampening pad thereby positioning the opposed guide surface of said other movable guide member in alignment with the outwardly diverting surface of the other fixed guide member to direct switch engaging members along the right output path.

3. A switching apparatus comprising:
   a pair of equal and opposite fixed guide members each having an angular guide surface and defining a central output path therebetween, a leftward output path extending along one of the angular guide surfaces, and a rightward output path extending along the other angular guide surface;
   a pair of wedge-shaped movable guide blocks having opposed angular guide surfaces for cooperation with the angular guide surfaces of the fixed guide blocks to selectively divert switch engaging members along one or the other of the leftward and rightward output paths and facing guide surfaces adapted to direct switch engaging members along the central guide path extending between the fixed guide blocks;
   a pair of opposed dampening pads positioned for engagement by the opposed guide surfaces of the movable guide members to position the facing guide surfaces of the movable guide blocks to direct switch engaging members along a central guide path;
   a first rotary solenoid for selectively engaging the facing guide surface of one of the movable guide members with the facing guide surface of the other guide member while the opposed surface of the other guide member engages its corresponding dampening pad and thereby positioning the opposed guide surface of said one of the movable guide members in alignment with the diverging guide surface of one of the fixed guide blocks to direct switch engaging members along the left output guide path; and
   a second rotary solenoid for selectively positioning the facing guide surface of said other movable guide member in engagement with the facing guide surface of said one of the guide members while the opposed guide surface thereof engages its corresponding dampening pad thereby positioning the opposed guide surface of said other movable guide member in alignment with the outwardly diverting surface of the other fixed guide member to direct switch engaging members along the right output path.

4. A method of switching comprising:
   providing a pair of equal and opposite fixed guide members each having an angular guide surface and defining a central output path therebetween, a leftward output path extending along one of the angular guide surfaces, and a rightward output path extending along the other angular guide surface;

providing a pair of wedge-shaped movable guide blocks having opposed angular guide surfaces for cooperation with the angular guide surfaces of the fixed guide blocks to selectively divert switch engaging members along one or the other of the leftward and rightward output paths and facing guide surfaces adapted to direct switch engaging members along the central guide path extending between the fixed guide blocks;

providing a pair of opposed dampening pads positioned for engagement by the opposed guide surfaces of the movable guide members to position the facing guide surfaces of the movable guide blocks to direct switch engaging members along a central guide path;

selectively engaging the facing guide surface of one of the movable guide members with the facing guide surface of the other guide member while the opposed surface of the other guide member engages its corresponding dampening pad and thereby positioning the opposed guide surface of said one of the movable guide members in alignment with the diverging guide surface of one of the fixed guide blocks to direct switch engaging members along the left output guide path; and selectively positioning the facing guide surface of said other movable guide member in engagement with the facing guide surface of said one of the guide members while the opposed guide surface thereof engages its corresponding dampening pad thereby positioning the opposed guide surface of said other movable guide member in alignment with the outwardly diverting surface of the other fixed guide member to direct switch engaging members along the right output path.

\* \* \* \* \*